US012584988B2

(12) United States Patent
Thomas et al.

(10) Patent No.: US 12,584,988 B2
(45) Date of Patent: Mar. 24, 2026

(54) POSITIONING REFERENCE SIGNAL RESOURCE CONFIGURATION

(71) Applicant: Lenovo (Singapore) Pte. Ltd., New Tech Park (SG)

(72) Inventors: Robin Thomas, Frankfurt am Main (DE); Ankit Bhamri, Rödermark (DE); Karthikeyan Ganesan, Kronberg im Taunus (DE); Ali Ramadan Ali, Kraiburg am Inn (DE)

(73) Assignee: Lenovo (Singapore) Pte. Ltd., Singapore (SG)

( * ) Notice: Subject to any disclaimer, the term of this patent is extended or adjusted under 35 U.S.C. 154(b) by 483 days.

(21) Appl. No.: 17/923,861

(22) PCT Filed: May 4, 2021

(86) PCT No.: PCT/IB2021/053695
§ 371 (c)(1),
(2) Date: Nov. 7, 2022

(87) PCT Pub. No.: WO2021/224767
PCT Pub. Date: Nov. 11, 2021

(65) Prior Publication Data
US 2023/0176170 A1       Jun. 8, 2023

Related U.S. Application Data

(60) Provisional application No. 63/021,588, filed on May 7, 2020.

(51) Int. Cl.
*G01S 5/02*          (2010.01)

(52) U.S. Cl.
CPC .......... *G01S 5/0244* (2020.05); *G01S 5/0236* (2013.01)

(58) Field of Classification Search
CPC .... G01S 5/0244; G01S 5/0236; G01S 5/0257; H04W 64/00
See application file for complete search history.

(56) References Cited

U.S. PATENT DOCUMENTS

| 10,645,647 | B2 * | 5/2020 | Bitra ................. H04W 52/0209 |
| 2017/0097404 | A1 | 4/2017 | Siomina et al. |

(Continued)

FOREIGN PATENT DOCUMENTS

| EP | 3678315 | A1 | 7/2020 |
| WO | 2019045141 | A1 | 7/2019 |

OTHER PUBLICATIONS

PCT/IB2021/053695, "Notification of Transmittal of the International Search Report and the Written Opinion of the International Searching Authority, or the Declaration", International Searching Authority, Jul. 19, 2021, pp. 1-16.

(Continued)

*Primary Examiner* — Kabir A Timory
(74) *Attorney, Agent, or Firm* — Kunzler Needham & Hilton

(57)          ABSTRACT

Apparatuses, methods, and systems are disclosed for positioning reference signal resource configuration. One method includes receiving, at a location server, a positioning reference signal resource configuration from at least one base station. The method includes determining positioning assistance data based on the positioning reference signal resource configuration. The positioning assistance data includes the positioning reference signal resource configuration for performing measurements and/or performing computation of a location estimate. The method includes transmitting the positioning assistance data to a user equipment or to a target (Continued)

500 device to enable the user equipment or the target device to perform the measurements and/or perform the computation of the location estimate.

19 Claims, 13 Drawing Sheets

(56)                    References Cited

U.S. PATENT DOCUMENTS

| | | | |
|---|---|---|---|
| 2019/0327707 A1* | 10/2019 | Agnihotri | ................. G01S 5/10 |
| 2020/0021946 A1 | 1/2020 | Kumar et al. | |
| 2020/0225309 A1 | 7/2020 | Manolakos et al. | |
| 2021/0076225 A1 | 3/2021 | Kim et al. | |
| 2022/0174641 A1* | 6/2022 | Cha | ......................... H04L 5/005 |
| 2023/0024368 A1* | 1/2023 | Gunnarsson | .......... H04W 64/00 |

OTHER PUBLICATIONS

Lenovo et al., "On Potential NR Positioning Enhancements", 3GPP TSG RAN WG1#103-e R1-2007998, Oct. 26-Nov. 13, 2020, pp. 1-9.

Qualcomm Inc., "New SID on NR Positioning Enhancements", 3GPP TSG RAN Meeting #86 RP-193237, Dec. 9-12, 2019, pp. 1-4.
3GPP, "3rd Generation Partnership Project; Technical Specification Group Radio Access Network; Study on NR Positioning Enhancements; (Release 17)", 3GPP TR 38.857 V0.0.1, May 2020, pp. 1-9.
3GPP, "3rd Generation Partnership Project; Technical Specification Group Radio Access Network; Study on channel model for frequencies from 0.5 to 100 GHz (Release 16)", 3GPP TR 38.901 V16.1.0, Dec. 2019, pp. 1-101.
3GPP, "3rd Generation Partnership Project; Technical Specification Group Radio Access Network; LTE Positioning Protocol (LPP) (Release 16)", 3GPP TS 37.355 V16.0.0, Mar. 2020, pp. 1-281.
3GPP, "3rd Generation Partnership Project; Technical Specification Group Radio Access Network; NR; Physical layer procedures for data (Release 16)", 3GPP TS 38.214 V16.1.0, Mar. 2020, pp. 1-151.
3GPP, 3rd Generation Partnership Project; Technical Specification Group Radio Access Network; NR; Physical layer measurements (Release 16), 3GPP TS 38.215 V16.1.0, Mar. 2020, pp. 1-22.
3GPP, "3rd Generation Partnership Project; Technical Specification Group Radio Access Network; NG Radio Access Network (NG-RAN); Stage 2 functional specification of User Equipment (UE) positioning in NG-RAN (Release 16)", 3GPP TS 38.305 V16.0.0, Mar. 2020, pp. 1-107.

* cited by examiner

200

300

400

| Target UE 402 | First gNB 404 | Second gNB 406 | Location Server 408 |
|---|---|---|---|

410

412

414

416

418

500

| Target UE 502 | Serving gNB 504 | Neighbor gNB 506 | Location Server 508 |
|---|---|---|---|

512

514

516

518

520

522

524

526

528

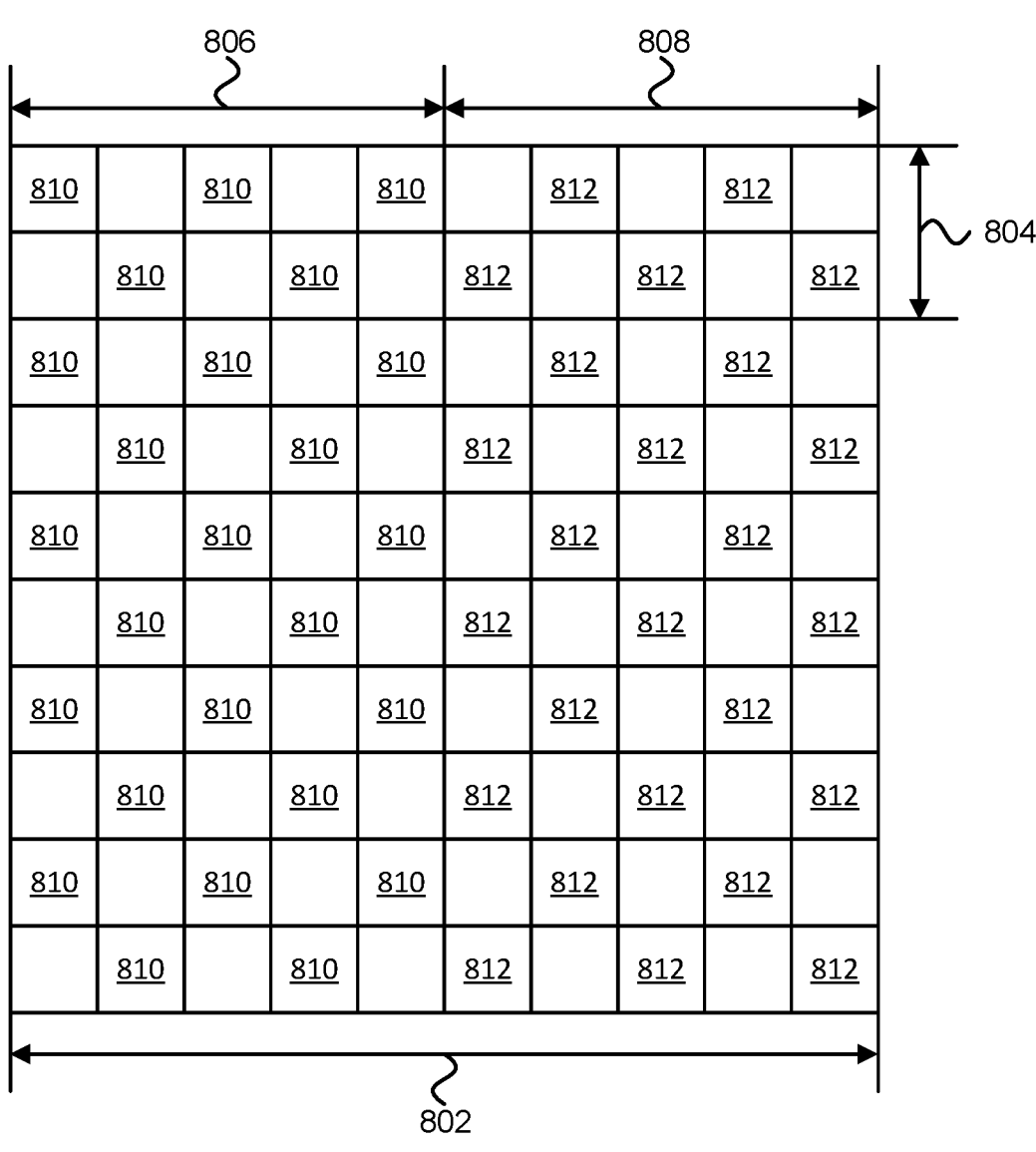
FIG. 8

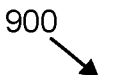
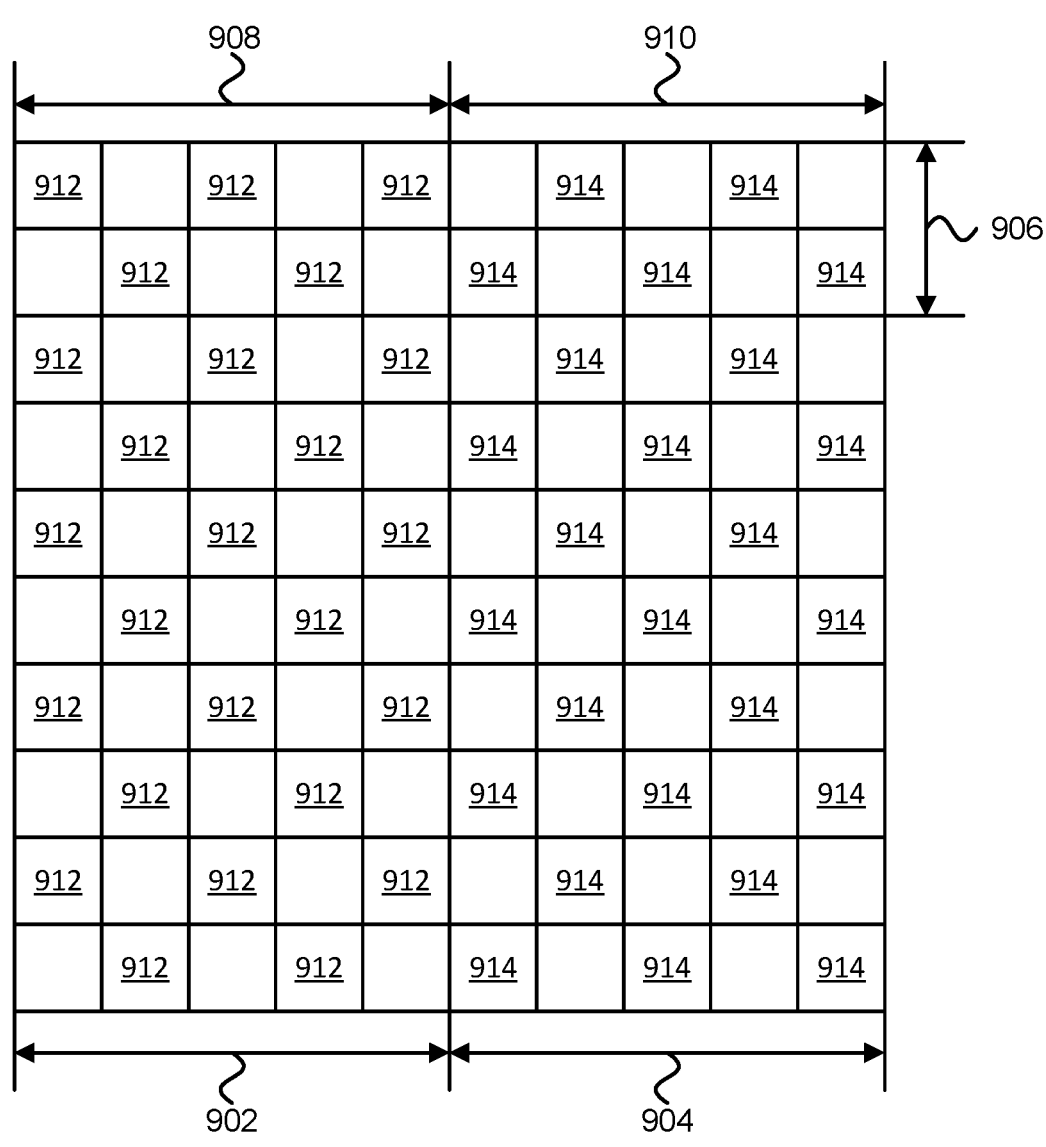
FIG. 9

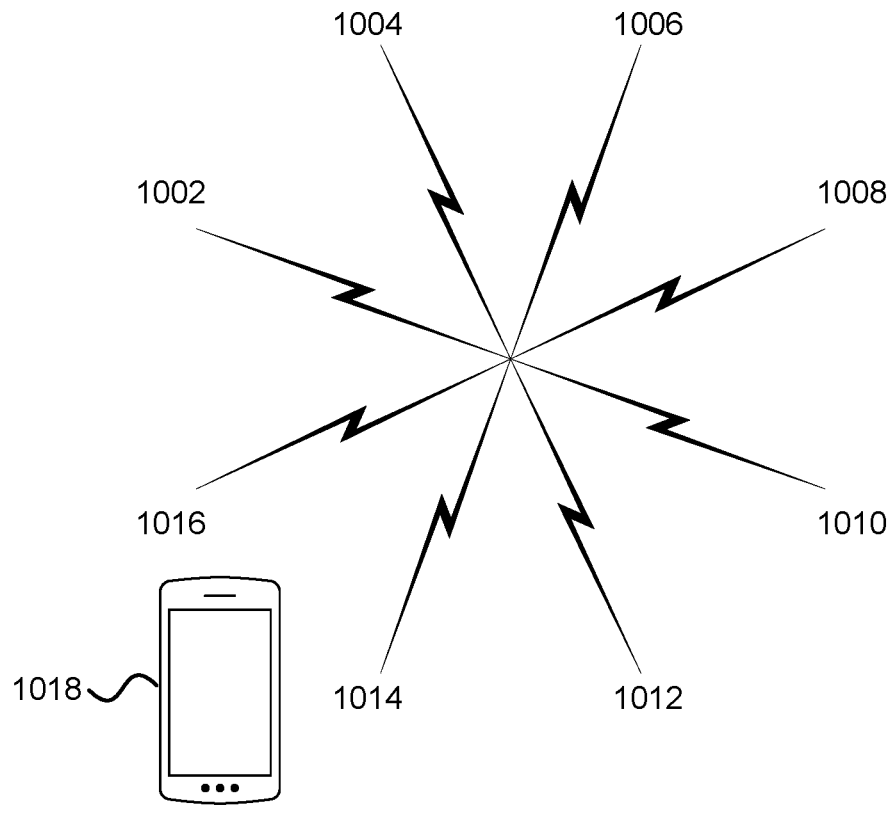
FIG. 10

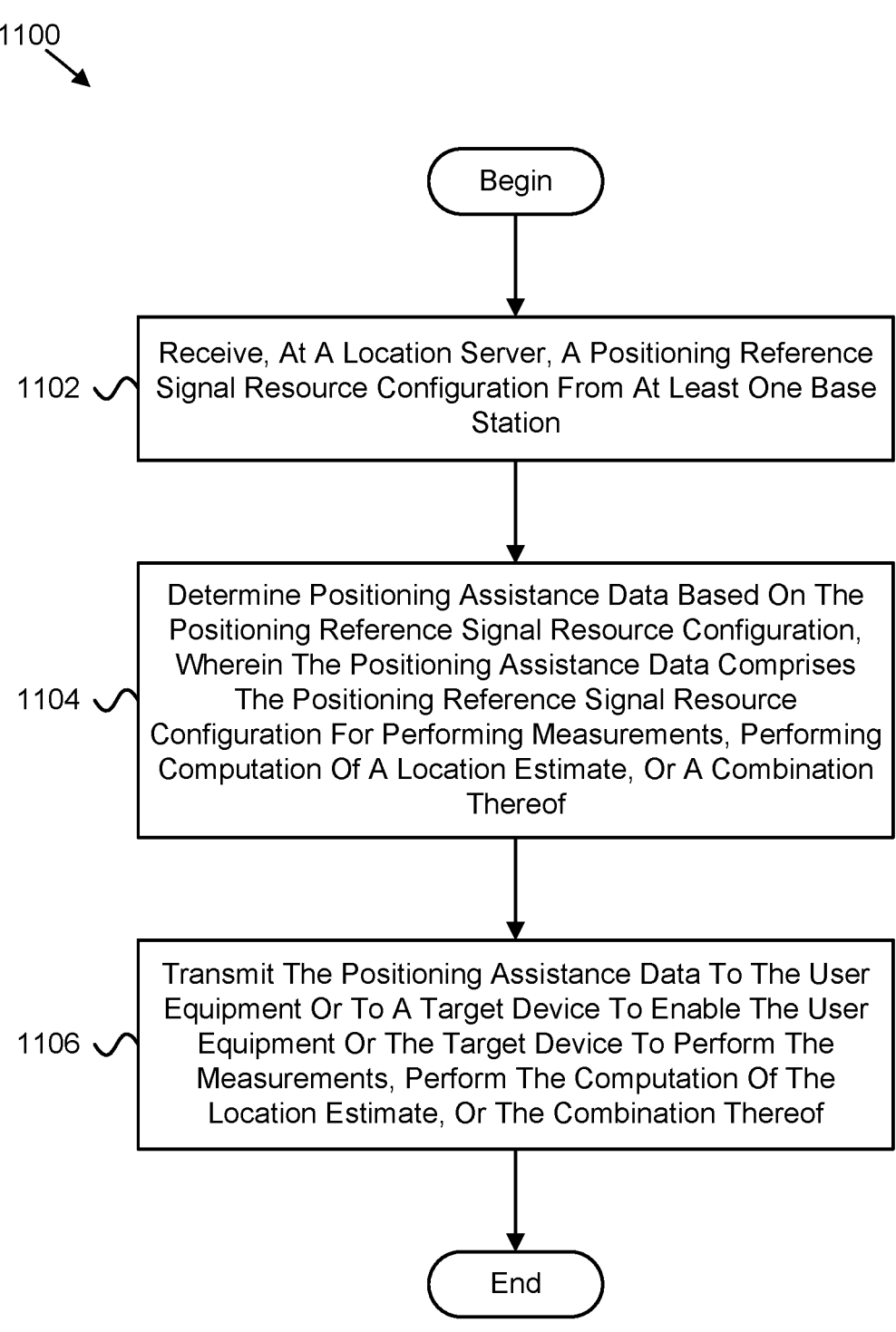

1100

Begin

1102 Receive, At A Location Server, A Positioning Reference Signal Resource Configuration From At Least One Base Station 1104 Determine Positioning Assistance Data Based On The Positioning Reference Signal Resource Configuration, Wherein The Positioning Assistance Data Comprises The Positioning Reference Signal Resource Configuration For Performing Measurements, Performing Computation Of A Location Estimate, Or A Combination Thereof 1106 Transmit The Positioning Assistance Data To The User Equipment Or To A Target Device To Enable The User Equipment Or The Target Device To Perform The Measurements, Perform The Computation Of The Location Estimate, Or The Combination Thereof End

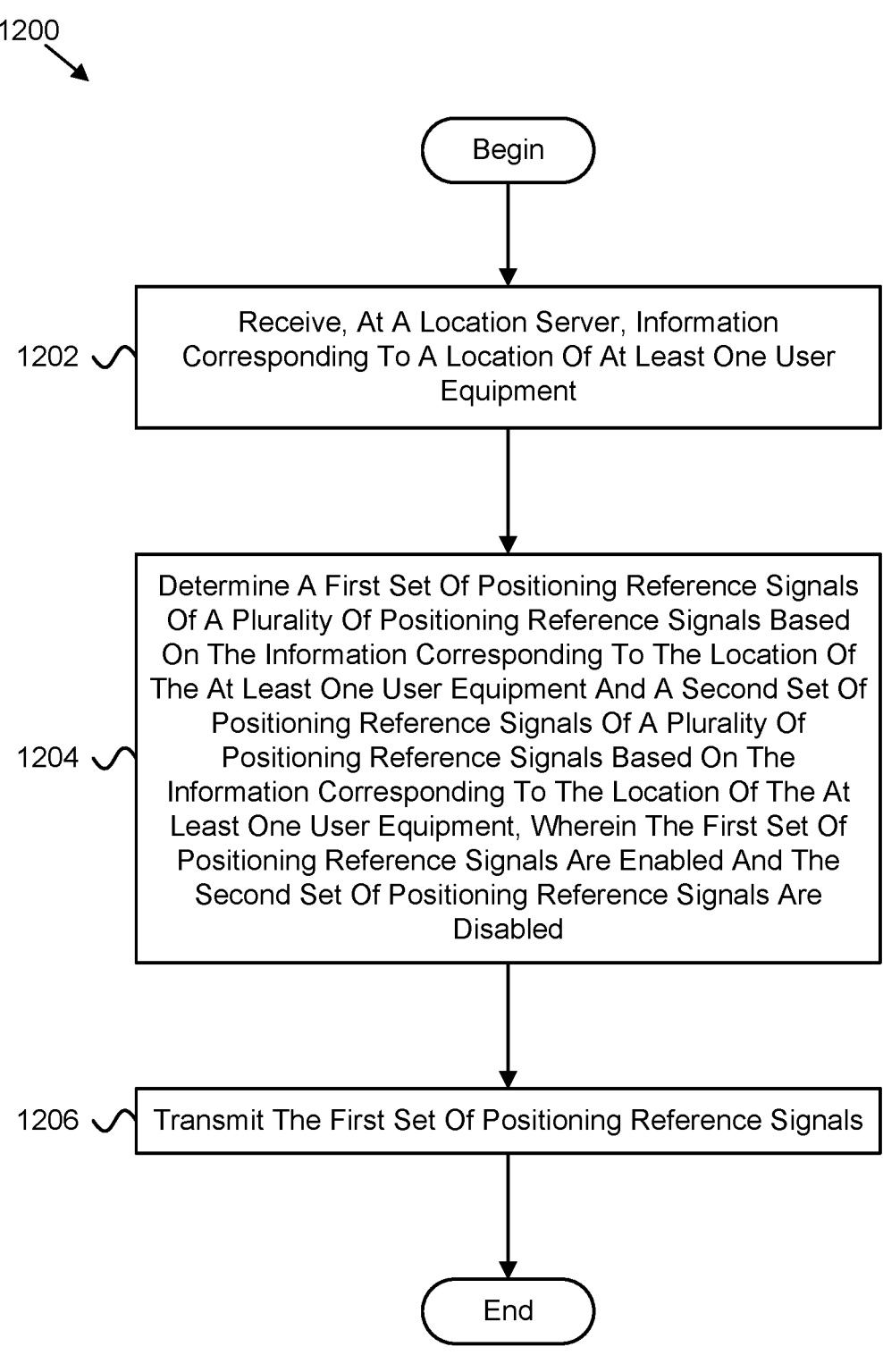

Begin

1202   Receive, At A Location Server, Information Corresponding To A Location Of At Least One User Equipment 1204   Determine A First Set Of Positioning Reference Signals Of A Plurality Of Positioning Reference Signals Based On The Information Corresponding To The Location Of The At Least One User Equipment And A Second Set Of Positioning Reference Signals Of A Plurality Of Positioning Reference Signals Based On The Information Corresponding To The Location Of The At Least One User Equipment, Wherein The First Set Of Positioning Reference Signals Are Enabled And The Second Set Of Positioning Reference Signals Are Disabled 1206   Transmit The First Set Of Positioning Reference Signals End

FIG. 12

POSITIONING REFERENCE SIGNAL RESOURCE CONFIGURATION

CROSS-REFERENCE TO RELATED APPLICATIONS

This application claims priority to U.S. Patent Application Ser. No. 63/021,588 entitled "APPARATUSES, METHODS, AND SYSTEMS FOR ENABLING HYBRID POSITIONING WITH PRS ENHANCEMENTS" and filed on May 7, 2020 for Robin Thomas, which is incorporated herein by reference in its entirety.

FIELD

The subject matter disclosed herein relates generally to wireless communications and more particularly relates to positioning reference signal resource configuration.

BACKGROUND

In certain wireless communications networks, various devices may use positioning. The positioning may have limited reliability and/or accuracy.

BRIEF SUMMARY

Methods for positioning reference signal resource configuration are disclosed. Apparatuses and systems also perform the functions of the methods. One embodiment of a method includes receiving, at a location server, a positioning reference signal resource configuration from at least one base station. In some embodiments, the method includes determining positioning assistance data based on the positioning reference signal resource configuration, wherein the positioning assistance data comprises the positioning reference signal resource configuration for performing measurements, performing computation of a location estimate, or a combination thereof. In certain embodiments, the method includes transmitting the positioning assistance data to a user equipment or to a target device to enable the user equipment or the target device to perform the measurements, perform the computation of the location estimate, or the combination thereof.

One apparatus for positioning reference signal resource configuration includes a location server. In certain embodiments, the apparatus includes a receiver that receives a positioning reference signal resource configuration from at least one base station. In various embodiments, the apparatus includes a processor that determines positioning assistance data based on the positioning reference signal resource configuration, wherein the positioning assistance data comprises the positioning reference signal resource configuration for performing measurements, performing computation of a location estimate, or a combination thereof. In some embodiments, the apparatus incudes a transmitter that transmits the positioning assistance data to a user equipment or to a target device to enable the user equipment or the target device to perform the measurements, perform the computation of the location estimate, or the combination thereof.

Another embodiment of a method for positioning reference signal resource configuration includes receiving, at a location server, information corresponding to a location of at least one user equipment. In some embodiments, the method includes determining a first set of positioning reference signals of a plurality of positioning reference signals based on the information corresponding to the location of the at least one user equipment and a second set of positioning reference signals of a plurality of positioning reference signals based on the information corresponding to the location of the at least one user equipment, wherein the first set of positioning reference signals are enabled and the second set of positioning reference signals are disabled. In various embodiments, the method includes transmitting the first set of positioning reference signals.

Another apparatus for positioning reference signal resource configuration includes a location server. In some embodiments, the apparatus includes a receiver that receives information corresponding to a location of at least one user equipment. In various embodiments, the apparatus includes a processor that determines a first set of positioning reference signals of a plurality of positioning reference signals based on the information corresponding to the location of the at least one user equipment and a second set of positioning reference signals of a plurality of positioning reference signals based on the information corresponding to the location of the at least one user equipment, wherein the first set of positioning reference signals are enabled and the second set of positioning reference signals are disabled. In certain embodiments, the apparatus includes a transmitter that transmits the first set of positioning reference signals.

One embodiment of a method for updating positioning assistance data includes transmitting, from a user equipment, an apriori signal comprising a beam identifier, a group of beam identifiers, or a group beam identifier that provides location information to a location server. In some embodiments, the method includes receiving updated positioning assistance data from the location server, wherein the updated positioning assistance data corresponds to the apriori signal and enables the user equipment to perform measurements, perform a computation of the location estimate, or a combination thereof.

One apparatus for updating positioning assistance data includes a user equipment. In certain embodiments, the apparatus includes a transmitter that transmits an apriori signal comprising a beam identifier, a group of beam identifiers, or a group beam identifier that provides location information to a location server. In various embodiments, the apparatus includes a receiver that receives updated positioning assistance data from the location server, wherein the updated positioning assistance data corresponds to the apriori signal and enables the user equipment to perform measurements, perform a computation of the location estimate, or a combination thereof.

BRIEF DESCRIPTION OF THE DRAWINGS

A more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which:

FIG. 8 is a schematic block diagram illustrating another embodiment of a PRS repetition configuration;

FIG. 9 is a schematic block diagram illustrating yet another embodiment of a PRS repetition configuration;

FIG. 10 is a schematic block diagram illustrating one embodiment of PRS transmission overhead reduction;

FIG. 11 is a flow chart diagram illustrating one embodiment of a method for positioning reference signal resource configuration;

FIG. 12 is a flow chart diagram illustrating another embodiment of a method for positioning reference signal resource configuration.

DETAILED DESCRIPTION

Figure 1:
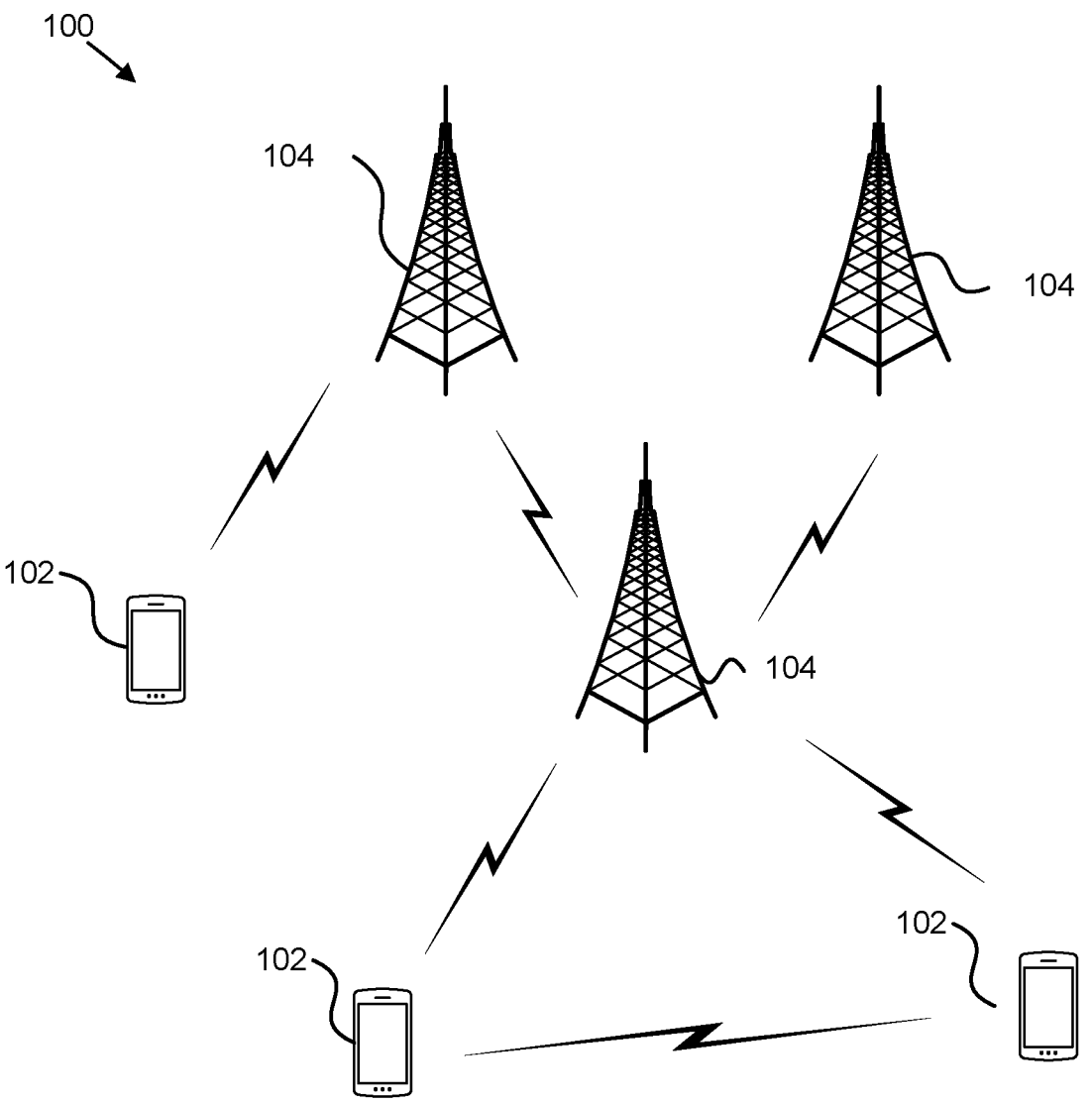
FIG. 1 is a schematic block diagram illustrating one embodiment of a wireless communication system for positioning reference signal resource configuration.

As will be appreciated by one skilled in the art, aspects of the embodiments may be embodied as a system, apparatus, method, or program product. Accordingly, embodiments may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, embodiments may take the form of a program product embodied in one or more computer readable storage devices storing machine readable code, computer readable code, and/or program code, referred hereafter as code. The storage devices may be tangible, non-transitory, and/or non-transmission. The storage devices may not embody signals. In a certain embodiment, the storage devices only employ signals for accessing code.

Certain of the functional units described in this specification may be labeled as is modules, in order to more particularly emphasize their implementation independence. For example, a module may be implemented as a hardware circuit comprising custom very-large-scale integration ("VLSI") circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in code and/or software for execution by various types of processors. An identified module of code may, for instance, include one or more physical or logical blocks of executable code which may, for instance, be organized as an object, procedure, or function. Nevertheless, the executables of an identified module need not be physically located together, but may include disparate instructions stored in different locations which, when joined logically together, include the module and achieve the stated purpose for the module.

Indeed, a module of code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different computer readable storage devices. Where a module or portions of a module are implemented in software, the software portions are stored on one or more computer readable storage devices.

Any combination of one or more computer readable medium may be utilized. The computer readable medium may be a computer readable storage medium. The computer readable storage medium may be a storage device storing the code. The storage device may be, for example, but not limited to, an electronic, magnetic, optical, electromagnetic, infrared, holographic, micromechanical, or semiconductor system, apparatus, or device, or any suitable combination of the foregoing.

More specific examples (a non-exhaustive list) of the storage device would include the following: an electrical connection having one or more wires, a portable computer diskette, a hard disk, a random access memory ("RAM"), a read-only memory ("ROM"), an erasable programmable read-only memory ("EPROM" or Flash memory), a portable compact disc read-only memory ("CD-ROM"), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Code for carrying out operations for embodiments may be any number of lines and may be written in any combination of one or more programming languages including an object oriented programming language such as Python, Ruby, Java, Smalltalk, C++, or the like, and conventional procedural programming languages, such as the "C" programming language, or the like, and/or machine languages such as assembly languages. The code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network ("LAN") or a wide area network ("WAN"), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and program products according to embodiments. It will be understood that each block of the schematic flowchart diagrams and/or schematic block diagrams, and combinations of blocks in the schematic flowchart diagrams and/or schematic block diagrams, can be implemented by code. The code may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The code may also be stored in a storage device that can direct a computer, other programmable data processing apparatus, or other devices to function in a particular manner, such that the instructions stored in the storage device produce an article of manufacture including instructions which implement the function/act specified in the schematic flowchart diagrams and/or schematic block diagrams block or blocks.

The code may also be loaded onto a computer, other programmable data processing apparatus, or other devices to cause a series of operational steps to be performed on the computer, other programmable apparatus or other devices to produce a computer implemented process such that the code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and program products according to various embodiments. In this regard, each block in the schematic flowchart diagrams and/or schematic block diagrams may represent a module, segment, or portion of code, which includes one or more executable instructions of the code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and code.

The description of elements in each figure may refer to elements of proceeding figures. Like numbers refer to like elements in all figures, including alternate embodiments of like elements.

FIG. 1 depicts an embodiment of a wireless communication system 100 for positioning reference signal resource configuration. In one embodiment, the wireless communication system 100 includes remote units 102 and network units 104. Even though a specific number of remote units 102 and network units 104 are depicted in FIG. 1, one of skill in the art will recognize that any number of remote units 102 and network units 104 may be included in the wireless communication system 100.

In one embodiment, the remote units 102 may include computing devices, such as desktop computers, laptop computers, personal digital assistants ("PDAs"), tablet computers, smart phones, smart televisions (e.g., televisions connected to the Internet), set-top boxes, game consoles, security systems (including security cameras), vehicle onboard computers, network devices (e.g., routers, switches, modems), aerial vehicles, drones, or the like. In some embodiments, the remote units 102 include wearable devices, such as smart watches, fitness bands, optical head-mounted displays, or the like. Moreover, the remote units 102 may be referred to as subscriber units, mobiles, mobile stations, users, terminals, mobile terminals, fixed terminals, subscriber stations, UE, user terminals, a device, or by other terminology used in the art. The remote units 102 may communicate directly with one or more of the network units 104 via UL communication signals. In certain embodiments, the remote units 102 may communicate directly with other remote units 102 via sidelink communication.

The network units 104 may be distributed over a geographic region. In certain embodiments, a network unit 104 may also be referred to and/or may include one or more of an access point, an access terminal, a base, a base station, a location server, a core network ("CN"), a radio network entity, a Node-B, an evolved node-B ("eNB"), a 5G node-B ("gNB"), a Home Node-B, a relay node, a device, a core network, an aerial server, a radio access node, an access point ("AP"), new radio ("NR"), a network entity, an access and mobility management function ("AMF"), a unified data management ("UDM"), a unified data repository ("UDR"), a UDM/UDR, a policy control function ("PCF"), a radio access network ("RAN"), a network slice selection function ("NSSF"), an operations, administration, and management ("OAM"), a session management function ("SMF"), a user plane function ("UPF"), an application function, an authentication server function ("AUSF"), security anchor functionality ("SEAF"), trusted non-3GPP gateway function ("TNGF"), or by any other terminology used in the art. The network units 104 are generally part of a radio access network that includes one or more controllers communicably coupled to one or more corresponding network units 104. The radio access network is generally communicably coupled to one or more core networks, which may be coupled to other networks, like the Internet and public switched telephone networks, among other networks. These and other elements of radio access and core networks are not illustrated but are well known generally by those having ordinary skill in the art.

In one implementation, the wireless communication system 100 is compliant with NR protocols standardized in third generation partnership project ("3GPP"), wherein the network unit 104 transmits using an OFDM modulation scheme on the downlink ("DL") and the remote units 102 transmit on the uplink ("UL") using a single-carrier frequency division multiple access ("SC-FDMA") scheme or an orthogonal frequency division multiplexing ("OFDM") scheme. More generally, however, the wireless communication system 100 may implement some other open or proprietary communication protocol, for example, WiMAX, institute of electrical and electronics engineers ("IEEE") 802.11 variants, global system for mobile communications ("GSM"), general packet radio service ("GPRS"), universal mobile telecommunications system ("UMTS"), long term evolution ("LTE") variants, code division multiple access 2000 ("CDMA2000"), Bluetooth®, ZigBee, Sigfoxx, among other protocols. The present disclosure is not intended to be limited to the implementation of any particular wireless communication system architecture or protocol.

The network units 104 may serve a number of remote units 102 within a serving area, for example, a cell or a cell sector via a wireless communication link. The network units 104 transmit DL communication signals to serve the remote units 102 in the time, frequency, and/or spatial domain.

In certain embodiments, a network unit 104 (e.g., location server) may receive a positioning reference signal resource configuration from at least one base station. In some embodiments, the network unit 104 may determine positioning assistance data based on the positioning reference signal resource configuration. The positioning assistance data comprises the positioning reference signal resource configuration for performing measurements, performing computation of a location estimate, or a combination thereof. In certain embodiments, the network unit 104 may transmit the positioning assistance data to a user equipment or to a target device to enable the user equipment or the target device to perform the measurements, perform the computation of the location estimate, or the combination thereof. Accordingly, the network unit 104 may be used for positioning reference signal resource configuration.

In various embodiments, a network unit 104 (e.g., location server) may receive information corresponding to a location of at least one user equipment. In some embodiments, the network unit 104 may determine a first set of positioning reference signals of a plurality of positioning reference signals based on the information corresponding to the location of the at least one user equipment and a second set of positioning reference signals of a plurality of positioning reference signals based on the information corresponding to the location of the at least one user equipment. The first set of positioning reference signals are enabled and the second set of positioning reference signals are disabled. In various embodiments, the network unit 104 may transmit the first set of positioning reference signals. Accordingly, the network unit 104 may be used for positioning reference signal resource configuration.

In certain embodiments, a remote unit 102 (e.g., user equipment) may transmit an apriori signal comprising a beam identifier, a group of beam identifiers, or a group beam identifier that provides location information to a location server. In some embodiments, the remote unit 102 may receive updated positioning assistance data from the location server. The updated positioning assistance data corresponds to the apriori signal and enables the user equipment to perform measurements, perform a computation of the location estimate, or a combination thereof. Accordingly, the remote unit 102 may be used for updating positioning assistance data.

Figure 2:
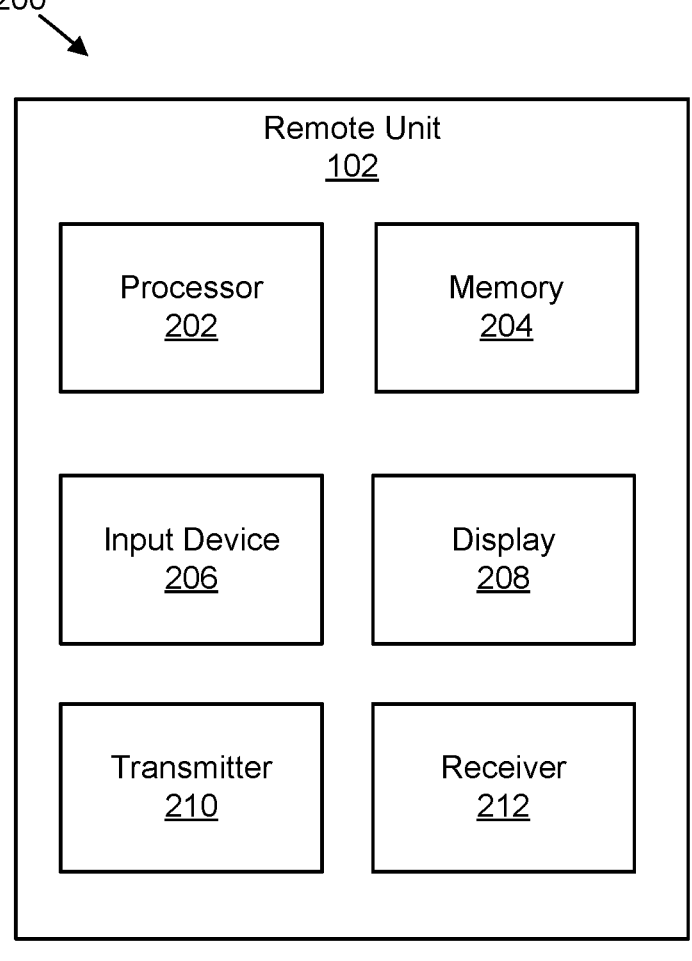
FIG. 2 is a schematic block diagram illustrating one embodiment of an apparatus that may be used for positioning reference signal resource configuration.

FIG. 2 depicts one embodiment of an apparatus 200 that may be used for positioning reference signal resource configuration. The apparatus 200 includes one embodiment of the remote unit 102. Furthermore, the remote unit 102 may include a processor 202, a memory 204, an input device 206, a display 208, a transmitter 210, and a receiver 212. In some embodiments, the input device 206 and the display 208 are combined into a single device, such as a touchscreen. In certain embodiments, the remote unit 102 may not include any input device 206 and/or display 208. In various embodiments, the remote unit 102 may include one or more of the processor 202, the memory 204, the transmitter 210, and the receiver 212, and may not include the input device 206 and/or the display 208.

The processor 202, in one embodiment, may include any known controller capable of executing computer-readable instructions and/or capable of performing logical operations. For example, the processor 202 may be a microcontroller, a microprocessor, a central processing unit ("CPU"), a graphics processing unit ("GPU"), an auxiliary processing unit, a field programmable gate array ("FPGA"), or similar programmable controller. In some embodiments, the processor 202 executes instructions stored in the memory 204 to perform the methods and routines described herein. The processor 202 is communicatively coupled to the memory 204, the input device 206, the display 208, the transmitter 210, and the receiver 212.

The memory 204, in one embodiment, is a computer readable storage medium. In some embodiments, the memory 204 includes volatile computer storage media. For example, the memory 204 may include a RAM, including dynamic RAM ("DRAM"), synchronous dynamic RAM ("SDRAM"), and/or static RAM ("SRAM"). In some embodiments, the memory 204 includes non-volatile computer storage media. For example, the memory 204 may include a hard disk drive, a flash memory, or any other suitable non-volatile computer storage device. In some embodiments, the memory 204 includes both volatile and non-volatile computer storage media. In some embodiments, the memory 204 also stores program code and related data, such as an operating system or other controller algorithms operating on the remote unit 102.

The input device 206, in one embodiment, may include any known computer input device including a touch panel, a button, a keyboard, a stylus, a microphone, or the like. In some embodiments, the input device 206 may be integrated with the display 208, for example, as a touchscreen or similar touch-sensitive display. In some embodiments, the input device 206 includes a touchscreen such that text may be input using a virtual keyboard displayed on the touchscreen and/or by handwriting on the touchscreen. In some embodiments, the input device 206 includes two or more different devices, such as a keyboard and a touch panel.

The display 208, in one embodiment, may include any known electronically controllable display or display device. The display 208 may be designed to output visual, audible, and/or haptic signals. In some embodiments, the display 208 includes an electronic display capable of outputting visual data to a user. For example, the display 208 may include, but is not limited to, a liquid crystal display ("LCD"), a light emitting diode ("LED") display, an organic light emitting diode ("OLED") display, a projector, or similar display device capable of outputting images, text, or the like to a user. As another, non-limiting, example, the display 208 may include a wearable display such as a smart watch, smart glasses, a heads-up display, or the like. Further, the display 208 may be a component of a smart phone, a personal digital assistant, a television, a table computer, a notebook (laptop) computer, a personal computer, a vehicle dashboard, or the like.

In certain embodiments, the display 208 includes one or more speakers for producing sound. For example, the display 208 may produce an audible alert or notification (e.g., a beep or chime). In some embodiments, the display 208 includes one or more haptic devices for producing vibrations, motion, or other haptic feedback. In some embodiments, all or portions of the display 208 may be integrated with the input device 206. For example, the input device 206 and display 208 may form a touchscreen or similar touch-sensitive display. In other embodiments, the display 208 may be located near the input device 206.

In some embodiments, the transmitter 210 of a user equipment transmits an apriori signal comprising a beam identifier, a group of beam identifiers, or a group beam identifier that provides location information to a location server. In various embodiments, the receiver 212 receives updated positioning assistance data from the location server. The updated positioning assistance data corresponds to the apriori signal and enables the user equipment to perform measurements and/or perform a computation of the location estimate.

Although only one transmitter 210 and one receiver 212 are illustrated, the remote unit 102 may have any suitable number of transmitters 210 and receivers 212. The transmitter 210 and the receiver 212 may be any suitable type of transmitters and receivers. In one embodiment, the transmitter 210 and the receiver 212 may be part of a transceiver.

Figure 3:
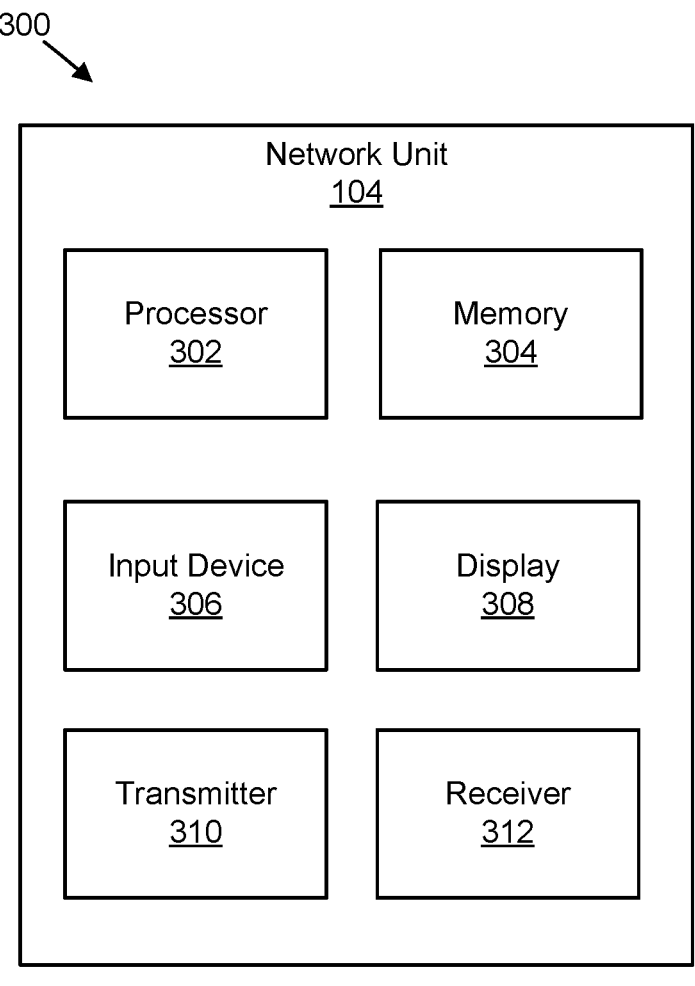
FIG. 3 is a schematic block diagram illustrating one embodiment of an apparatus that may be used for positioning reference signal resource configuration.

FIG. 3 depicts one embodiment of an apparatus 300 that may be used for positioning reference signal resource configuration. The apparatus 300 includes one embodiment of the network unit 104. Furthermore, the network unit 104 may include a processor 302, a memory 304, an input device 306, a display 308, a transmitter 310, and a receiver 312. As may be appreciated, the processor 302, the memory 304, the input device 306, the display 308, the transmitter 310, and the receiver 312 may be substantially similar to the processor 202, the memory 204, the input device 206, the display 208, the transmitter 210, and the receiver 212 of the remote unit 102, respectively.

In certain embodiments, the receiver 312 receives a positioning reference signal resource configuration from at least one base station. In various embodiments, the processor 302 determines positioning assistance data based on the positioning reference signal resource configuration. The positioning assistance data comprises the positioning reference signal resource configuration for performing measurements and/or performing computation of a location estimate. In some embodiments, the transmitter 310 transmits the positioning assistance data to a user equipment or to a target device to enable the user equipment or the target device to perform the measurements, perform the computation of the location estimate, or the combination thereof.

In some embodiments, the receiver 312 receives information corresponding to a location of at least one user equipment. In various embodiments, the processor 302 determines a first set of positioning reference signals of a plurality of positioning reference signals based on the information corresponding to the location of the at least one user equipment and a second set of positioning reference signals of a plurality of positioning reference signals based on the information corresponding to the location of the at least one user equipment. The first set of positioning reference signals are enabled and the second set of positioning reference signals are disabled. In certain embodiments, the transmitter 310 transmits the first set of positioning reference signals.

In various embodiments, target device and/or user equipment ("UE") positioning may use NR technology. In some embodiments, positioning features include fifth generation core network ("5GC") architectural and/or interface enhancements, and radio access node ("RAN") functionality that support physical layer, layer-2 signaling procedures, and/or layer-3 signaling procedures to enable NR positioning.

In certain embodiments, a hybrid positioning framework may be enabled for network-assisted and UE-based positioning to enhance reliability and accuracy of a position estimate. In various embodiments, a combination of available positioning techniques may be used to increase network and UE flexibility and may contribute to a reliable and a more accurate position estimate. In some embodiments, multi-TRP positioning may be leveraged on a factory floor or industrial internet of things ("IIoT") setting to improve positioning performance and reach a required precision for various applications. In certain embodiments, a hybrid positioning framework in NR may be enabled.

In various embodiments, physical layer procedures for supporting a hybrid positioning configuration may be used. In some embodiments, hybrid positioning reference signal ("PRS") configuration may be made using PRS repetition configurations. In certain embodiments, dynamic PRS configurations may be supported for various positioning techniques including hybrid positioning. In various embodiments, selective transmission may be based on beam grouping by avoiding PRS transmissions on transmit ("TX") beams that may be received by a single UE receive ("RX") beam.

As may be appreciated, various embodiments described herein may be used separate from one another, or two or more embodiments described herein may be combined. In a first embodiment, a hybrid positioning framework may be enabled for network-assisted and UE-based positioning.

In some embodiments, gNBs (e.g., including serving and neighboring base stations) may inform a location server (e.g., location management function ("LMF"), location management component ("LMC"), enhanced serving mobile location center ("E-SMLC")) about available bandwidth and physical resources associated with PRS for enabling RAT-dependent positioning methods for a hybrid positioning technique. In certain embodiments, if network-assisted positioning is used, a pairwise combination of positioning techniques may be used, which may be configured by the location server (e.g., LMF, LMC, E-SMLC) and signaled to a UE. In various embodiments, a LMF may request measurements (e.g., network-assisted positioning) or a location estimate (e.g., UE-based positioning). Thereafter, in some embodiments, a UE may perform required measurements as detailed in hybrid positioning configurations and may signal a measurement report to a location server. In certain embodiments, such as for UE-based positioning, hybrid position assistance data may enable a UE to compute a location estimate at the UE and transmit the location estimate to an LMF.

Figure 4:
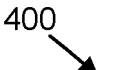
FIG. 4 is a network communications diagram illustrating one embodiment of communications in a hybrid positioning signaling framework.

FIG. 4 is a network communications diagram illustrating one embodiment of communications 400 in a hybrid positioning signaling framework. The communications 400 include messages transmitted between a target UE 402, a first gNB 404, a second gNB 406, and a location server 408 (e.g., LMF). Each of the communications 400 may include one or more messages.

In a first communication 410 transmitted from the first gNB 404 to the location server 408 (e.g., via NR positioning protocol annex ("NRPPa")), the first gNB 404 may transmit one or more PRS configurations for hybrid positioning to the location server 408. In a second communication 412 transmitted from the second gNB 406 to the location server 408 (e.g., via NRPPa), the second gNB 406 may transmit one or more PRS configurations for hybrid positioning to the location server 408. In a third communication 414 transmitted from the location server 408 to the target UE 402 (e.g., via LTE positioning protocol ("LPP")), the location server 408 may provide hybrid positioning assistance data to the target UE 402. In a fourth communication 416 transmitted from the location server 408 to the target UE 402 (e.g., via LPP), the location server 408 may request hybrid positioning location information from the target UE 402. In a fifth communication 418 transmitted from the target UE 402 to the location server 408 (e.g., via LPP), the target UE 402 may transmit hybrid positioning measurements or a location estimate to the location server 408.

In various embodiments, there may be permutations of hybrid positioning techniques involving a pairwise combination of positioning techniques (e.g., assisted global navigation satellite system ("A-GNSS"), downlink time difference of arrival ("DL-TDOA") and downlink angle of departure ("DL-AOD")) for UE-based positioning are shown in Table 1. In certain embodiments, capability signaling exchange, such as a capabilities request (e.g., RequestCapabilities) and capabilities provisioning (e.g., ProvideCapabilities), may facilitate different types of radio access technology ("RAT") dependent and RAT-independent positioning techniques being supported by a UE, which may be used in combination with each other to enable hybrid positioning.

In some embodiments, UE and/or gNB assistance information may be provided to a location server to aid target UE location estimation using a hybrid positioning configuration. In various embodiments, such as for UE-based hybrid positioning, a location server and/or a gNB may provide network assistance information to a UE.

Figure 5:
FIG. 5 is a network communications diagram illustrating one embodiment of communications showing hybrid positioning signaling options.

FIG. 5 is a network communications diagram illustrating one embodiment of communications 500 showing hybrid positioning signaling options. The communications 500 include messages transmitted between a target UE 502, a serving gNB 504, a neighbor gNB 506, and a location server 508 (e.g., LMF). Each of the communications 500 may include one or more messages.

In a first set of communications 512, UE and gNB assistance information signaling may be used. One or more communications of the set of communications 512 may be used in an embodiment. Specifically, in a first communication 514 transmitted from the serving gNB 504 to the location server 508 (e.g., via NRPPa), the serving gNB 504 may transmit assistance information for hybrid positioning to the location server 508. In a second communication 516 transmitted from the neighbor gNB 506 to the location server 508 (e.g., via NRPPa), the neighbor gNB 506 may transmit assistance information for hybrid positioning to the location server 508. In a third communication 518 transmitted from the target UE 502 to the location server 508 (e.g., via LPP), the target UE 502 may transmit assistance information for hybrid positioning to the location server 508. In a fourth communication 520 transmitted from the target UE

502 to the serving gNB 504 (e.g., via radio resource control ("RRC")), the target UE 502 transmits assistance information for hybrid positioning to the serving gNB 504. In a fifth communication 522 transmitted from the serving gNB 504 to the location server 508 (e.g., via NRPPa), the serving gNB 504 may forward the hybrid positioning assistance information received from the target UE 502 to the location server 508.

In a second set of communications 524, gNB and LMF assistance information signaling may be used. One or more communications of the set of communications 524 may be used in an embodiment. Specifically, in a sixth communication 526 transmitted from the location server 508 to the target UE 502 (e.g., via LPP), the location server 508 provides hybrid positioning assistance data to the target UE 502. Further, in a seventh communication 528 transmitted from the serving gNB 504 to the target UE 502 (e.g., via RRC), the serving gNB 504 provides hybrid positioning assistance information to the target UE 502.

In various embodiments, a different number of positioning techniques and/or a combination of positioning techniques may be used in conjunction with each other to enhance reliability and/or accuracy of a position estimate. Such embodiments do not preclude other supported positioning techniques indicated in Table 1 or future positioning techniques that rely on sidelink (e.g., sidelink ("SL") positioning) or NR-unlicensed (e.g., NR-unlicensed positioning or license assisted access ("LAA") positioning) operations.

TABLE 1

| Hybrid Positioning Configuration | | | |
|---|---|---|---|
| | A-GNSS | DL-TDOA | DL-AOD |
| Hybrid Positioning Technique 1 | Yes | Yes | |
| Hybrid Positioning Technique 2 | Yes | | Yes |
| Hybrid Positioning Technique 3 | | Yes | Yes |

In certain embodiments, a hybrid positioning configuration may be selected and adapted based on desired accuracy requirements at an LMF and/or a UE. In some embodiments, PRS configurations for hybrid positioning may be enhanced and made more dynamic using PRS repetitions and transmission configuration indicator ("TCI") state enhancement.

In a second embodiment, physical layer procedures for enabling hybrid positioning may be used. In such an embodiment, PRS design enhancements may be used to exploit hybrid positioning configurations.

In some embodiments, hybrid positioning measurements may be performed based on PRS repetitions within a single PRS occasion.

Figure 6:
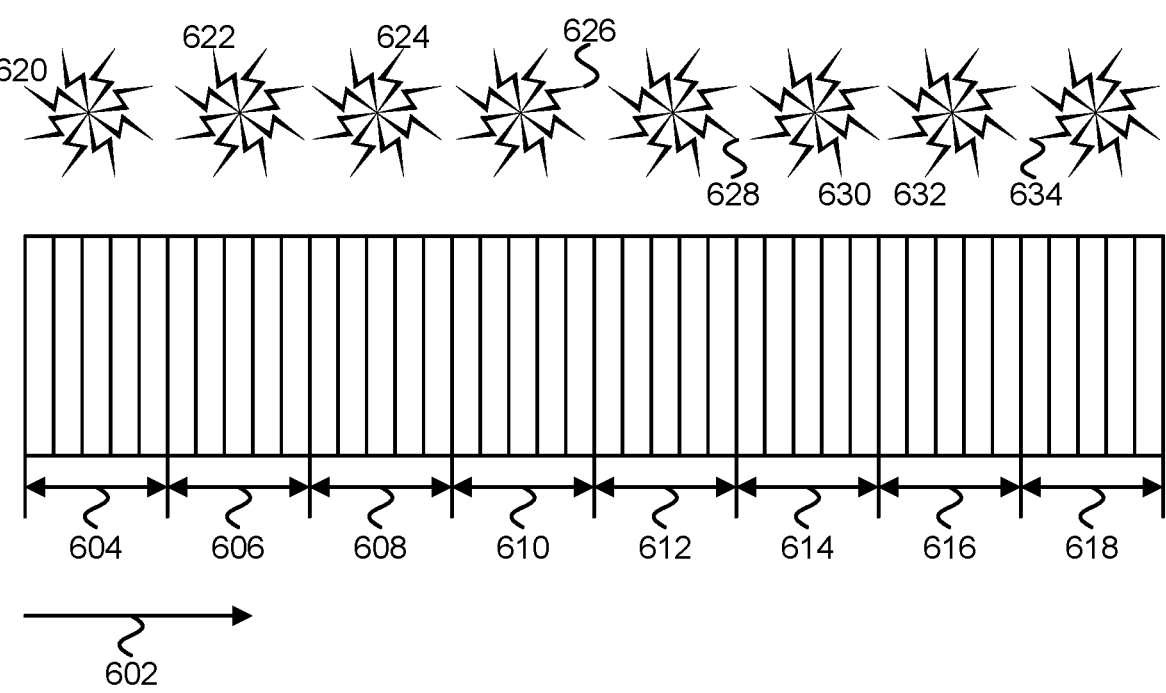
FIG. 6 is a timing diagram illustrating one embodiment of PRS transmission occasions.

In various embodiments, a downlink ("DL") PRS occasion may be defined as an instance of periodically repeated time windows (e.g., consecutive slots) in which the DL PRS is expected to be transmitted (e.g., for example, see FIG. 6 in which a PRS occasion corresponds to a specific transmit beam from a RAN node). In certain embodiments, a DL PRS resource may be repeated several times within a single instance of a DL PRS resource set and may be defined by a parameter (e.g., DL-PRS-ResourceRepetitionFactor). In some embodiments, the following set of PRS repetition factors may be used: DL-PRS-ResourceRepetitionFactor={1, 2, 4, 6, 8, 16, 32}. In various embodiments, within a resource set there may be a number of PRS occasions in which a particular PRS resource may be repeated a number of times.

Figure 7:
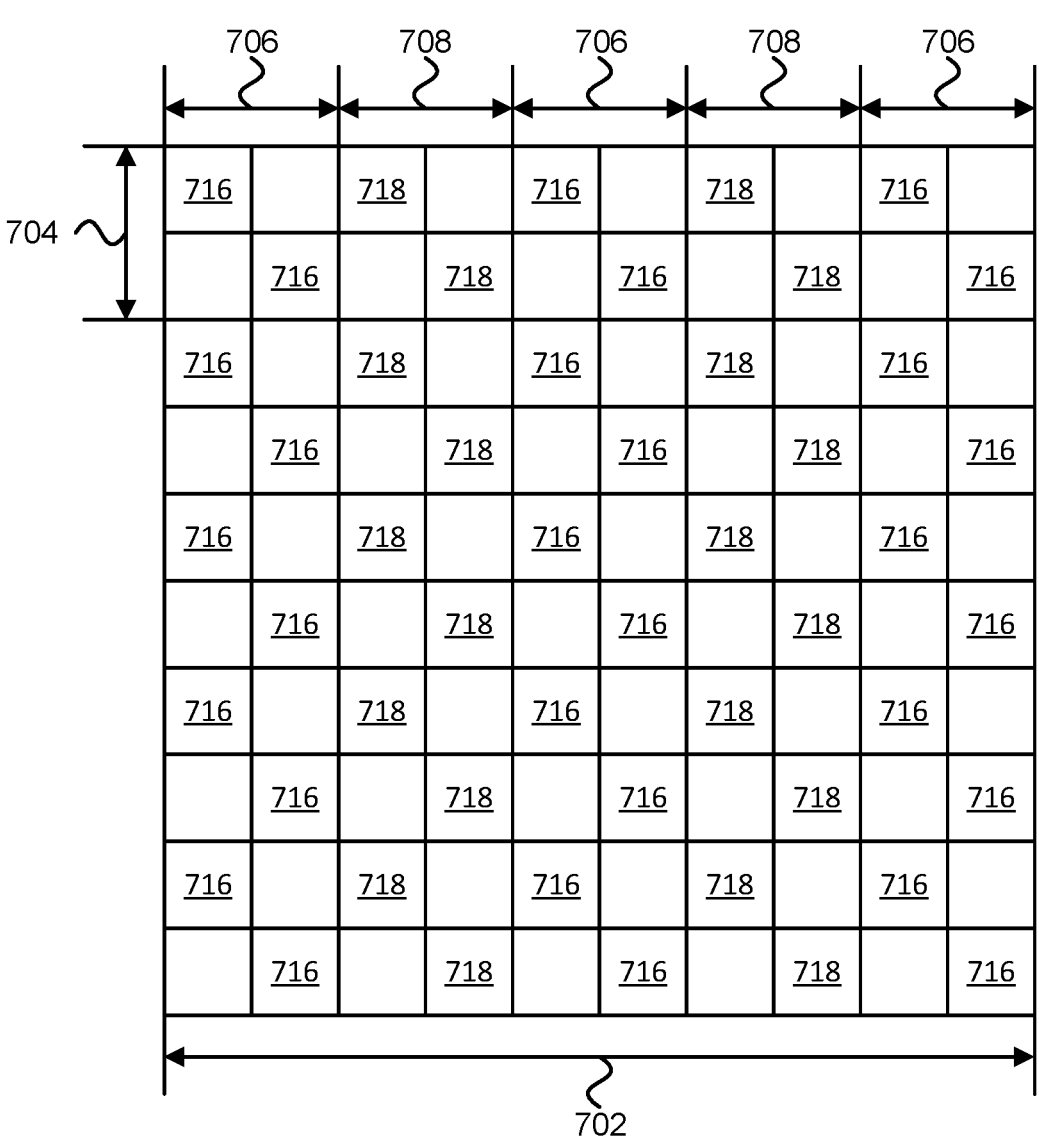
FIG. 7 is a schematic block diagram illustrating one embodiment of a PRS repetition configuration.

In some embodiments, each PRS repetition may be associated with a UE positioning measurement corresponding to a different positioning technique (e.g., RAT-dependent positioning method), which may be a part of a hybrid positioning configuration. FIGS. 7 through 9 show examples of different PRS repetition configurations using a PRS comb-2 sequence generated with 5 PRS repetitions. The PRS repetition configurations correspond to PRS resource measurements that correspond to DL-TDOA and DL-AOD positioning techniques. This may allow for the following: 1) each PRS repetition pattern may be set within a PRS occasion or single beam that may be associated with measurements corresponding to a positioning technique within a hybrid positioning configuration (e.g., see FIG. 7)—this may translate to a beam repetition with a PRS pattern which may correspond to a different positioning technique in each repetition; 2) a PRS repetition group may be configured and may include consecutive repetitions that may be associated with measurements corresponding to a positioning technique within a hybrid positioning configuration (e.g., see FIG. 8); 3) this may include embodiments in which a PRS repetition group may be associated with measurements relating to a single positioning technique for a particular beam (e.g., see FIG. 9)—the PRS repetition may span different resource sets (e.g., group of beams); and/or 4) the PRS repetition group or pattern may also be configured to a group of UEs.

In various embodiments, PRS repetitions may be exploited which may have otherwise been used to perform measurements for a single positioning technique. In certain embodiments, efficient UE measurements relating to a hybrid positioning configuration may be used by increasing the flexibility in a single PRS occasion or a group of beams.

FIG. 6 is a timing diagram 600 illustrating one embodiment of PRS transmission occasions. The timing diagram 600 is illustrated over time 602, and includes a first PRS occasion 604, a second PRS occasion 606, a third PRS occasion 608, a fourth PRS occasion 610, a fifth PRS occasion 612, a sixth PRS occasion 614, a seventh PRS occasion 616, and an eighth PRS occasion 618. The first PRS occasion 604 may use a first beam 620, the second PRS occasion 606 may use a second beam 622, the third PRS occasion 608 may use a third beam 624, the fourth PRS occasion 610 may use a fourth beam 626, the fifth PRS occasion 612 may use a fifth beam 628, the sixth PRS occasion 614 may use a sixth beam 630, the seventh PRS occasion 616 may use a seventh beam 632, and the eighth PRS occasion 618 may use an eighth beam 634.

FIG. 7 is a schematic block diagram illustrating one embodiment of a PRS repetition configuration 700. The PRS repetition configuration 700 includes a PRS occasion 702, which includes a PRS sequence comb-2 pattern 704, a first PRS repetition pattern 706 (e.g., DL-TDOA) and a second PRS repetition pattern 708 (e.g., DL-AOD). The first PRS repetition pattern 706 includes a PRS repetition for DL-TDOA measurements 716, and the second PRS repetition pattern 708 includes a PRS repetition for DL-AOD measurements 718.

FIG. 8 is a schematic block diagram illustrating another embodiment of a PRS repetition configuration 800. The PRS repetition configuration 800 includes a PRS occasion 802, which includes a PRS sequence comb-2 pattern 804, a first PRS repetition pattern 806 (e.g., DL-TDOA) and a second PRS repetition pattern 808 (e.g., DL-AOD). The first PRS repetition pattern 806 includes a PRS repetition for DL-TDOA measurements 810, and the second PRS repetition pattern 808 includes a PRS repetition for DL-AOD measurements 812.

FIG. 9 is a schematic block diagram illustrating yet another embodiment of a PRS repetition configuration 900. The PRS repetition configuration 900 includes a first beam 902 and a second beam 904, and further includes a PRS sequence comb-2 pattern 906, a first PRS resource set 908 (e.g., DL-TDOA) and a second PRS resource set 910 (e.g., DL-AOD). The first PRS resource set 908 includes a PRS repetition for DL-TDOA measurements 912, and the second PRS resource set 908 includes a PRS repetition for DL-AOD measurements 914.

In various embodiments, a dynamic hybrid positioning PRS configuration may be based on a TCI state.

In some embodiments, a UE may be configured with DL-PRS quasi-co-location ("QCL") information. If a QCL relation is between two DL PRS resources, the UE may be allowed to assume that those DL PRS resources are from the same cell. If DL-PRS QCL information is configured with the UE with 'QCL-Type-D' with a source DL-PRS resource, then a DL-PRS resource set identifier (e.g., ResourceSetId) and a DL-PRS resource identifier (e.g., ResrouceId) of a source DL-PRS resource may be expected to be indicated to the UE. In such embodiments, the DL PRS may also be configured to be 'QCL-Type-D' or 'QCL-Type-C' with a synchronization signal ("SS") and/or physical broadcast channel ("PBCH") block from a serving cell or a non-serving cell. Therefore, the UE may make the assumption that a physical downlink shared channel ("PDSCH") containing the DL-PRS uses the same spatial filter as the source RS, which may either be a SS and/or PBCH or another DL-PRS. In NR, this may be indicated by a TCI. Moreover, a location server may transmit the QCL assumption via assistance data signaling, which is transparently broadcasted from an gNB via an LPP.

In certain embodiments, if there is a dynamic change in available physical resources, bandwidth, and/or channel state conditions, a current LPP signaling may not address rapid adaptation of changing conditions. In such embodiments, dynamic adaptation of a QCL assumption may not be made. For hybrid positioning this may be beneficial to better dynamically adapt beams containing PRS resources (e.g., QCL association based on an appropriate hybrid positioning configuration).

In various embodiments, an enhanced TCI state indication may be included for a PRS resource with other source RSs (e.g., channel state information reference signal ("CSI-RS") to enable a dynamic QCL association for a hybrid positioning PRS resource configuration using supported QCL assumptions with DL-PRS as a target RS). In some embodiments, a TCI state together with a corresponding QCL assumption may be indicated to a target UE via higher-layer signaling (e.g., medium access control ("MAC"), physical ("PHY") layer, or a dynamic LPP signaling configuration (e.g., via downlink control information ("DCI") indication from a gNB).

In a third embodiment, PRS overhead reduction may be performed based on an approximate location of a UE and/or a group of UEs.

In some embodiments, a gNB initially informs an LMF about a PRS configuration based on available physical resources and bandwidth. In such embodiments, this may involve PRS transmissions across all beam directions. However, for a stationary and/or low mobility UE and/or group of UEs located in a specific sector under coverage of a few beams, the PRS transmissions in certain directions may have little benefit. For hybrid positioning, additional PRS resources may be configured depending on a number of positioning techniques required for a particular configuration.

In certain embodiments, a gNB and/or a UE may provide an apriori indication to a location server to indicate which TX beams may be prioritized and/or down selected for PRS transmissions associated with a beam and/or transmission and reception point ("TRP") based on its geographic location within a cell. In various embodiments, an apriori indication may include: 1) a UE reported beam identifier ("ID") used to inform a gNB as to a general beamforming direction in which the UE and/or a group of UEs are located—an LMF may then configure PRS transmit resources in indicated geographical regions of a cell in which to receive desired measurements; and/or 2) a gNB and/or a UE reported group beam ID may inform an LMF about which set of beams is within the UE coverage—this may also correspond to a resource set ID.

FIG. 10 is a schematic block diagram 1000 illustrating one embodiment of PRS transmission overhead reduction. The schematic block diagram 1000 includes a first beam 1002, a second beam 1004, a third beam 1006, a fourth beam 1008, a fifth beam 1010, a sixth beam 1012, a seventh beam 1014, and an eighth beam 1016. The schematic block diagram 1000 also includes a UE 1018. In some embodiments, the seventh beam 1014 and the eighth beam 1016 indications may be provided by a gNB and/or the UE 1018 and may be prioritized by a location server to support measurements arising from this set of PRS resources within a particular resource set. In certain embodiments, the seventh beam 1014 and the eighth beam 1016 may be grouped under a group ID and forwarded to the location server (e.g., the seventh beam 1014 and the eighth beam 1016 may be enabled). PRS transmissions on the first beam 1002, the second beam 1004, the third beam 1006, the fourth beam 1008, the fifth beam 1010, and the sixth beam 1012 are not required based on the reported apriori indication (e.g., the beams may be disabled).

In various embodiments, for a dynamic configuration, PRS transmissions on the first beam 1002, the second beam 1004, the third beam 1006, the fourth beam 1008, the fifth beam 1010, and the sixth beam 1012 may be muted, allowing for better detection at a target UE. In such embodiments, this may increase flexibility to adapt a number of beams required based on a location (e.g., approximate location) of a UE and/or group of UEs and/or desired accuracy requirements.

In certain embodiments, a location server may receive beam indication reports from beams and/or TRPs from a serving gNB and/or neighboring gNBs (e.g., using assistance information signaling).

In some embodiments, UE and/or gNB assistance signaling avoids unnecessary PRS transmissions in sparse cells if a UE or group of UEs are only located in a specific geographic region of a cell. The advantages of this PRS overhead reduction scales with a number of transmitted beams, especially if multiple positioning techniques are used (e.g., with hybrid positioning and in frequency ranges greater than frequency range 2 ("FR2").

FIG. 11 is a flow chart diagram illustrating one embodiment of a method 1100 for positioning reference signal resource configuration. In some embodiments, the method 1100 is performed by an apparatus, such as the network unit 104. In certain embodiments, the method 1100 may be performed by a processor executing program code, for example, a microcontroller, a microprocessor, a CPU, a GPU, an auxiliary processing unit, a FPGA, or the like.

In various embodiments, the method 1100 includes receiving 1102, at a location server, a positioning reference signal resource configuration from at least one base station. In some embodiments, the method 1100 includes determining 1104 positioning assistance data based on the positioning reference signal resource configuration, wherein the positioning assistance data comprises the positioning reference signal resource configuration for performing measurements, performing computation of a location estimate, or a combination thereof. In certain embodiments, the method 1100 includes transmitting 1106 the positioning assistance data to a user equipment or to a target device to enable the user equipment or the target device to perform the measurements, perform the computation of the location estimate, or the combination thereof.

In certain embodiments, the method 1100 further comprises receiving an indication that facilitates efficient transmission of the positioning reference signal resource configuration for performing the measurements, performing the computation of the location estimate, or the combination thereof corresponding to a specific positioning technique or a hybrid positioning technique. In some embodiments, the indication comprises a beam identifier, a group of beam identifiers, or a group beam identifier that provides location information corresponding to the user equipment within a geographic region of a serving base station. In various embodiments, the indication is transmitted from a base station, the base station receives an apriori signal from at least one user equipment, and the apriori signal comprises the beam identifier, the group of beam identifiers, or the group beam identifier.

In one embodiment, the apriori signal is transmitted via a physical uplink control channel transmission, a physical uplink shared channel transmission, a medium access control message, radio resource control signaling, a positioning protocol, or some combination thereof. In certain embodiments, the indication is transmitted from the user equipment, and the apriori signal comprises the beam identifier, the group of beam identifiers, or the group beam identifier. In some embodiments, the apriori signal is transmitted via a physical uplink control channel transmission, a physical uplink shared channel transmission, a medium access control message, radio resource control signaling, a positioning protocol, or some combination thereof.

In various embodiments, the method 1100 further comprises transmitting a first set of positioning reference signals of a plurality of positioning reference signals based on the indication. In one embodiment, the first set of positioning reference signals are enabled and a second set of positioning reference signals of the plurality of positioning reference signals are disabled.

In certain embodiments, the method 1100 further comprises transmitting a plurality of positioning reference signals based on a predetermined pattern. In some embodiments, the positioning assistance data comprises quasi-co-location information, repetition information, comb-pattern information, muting information, or some combination thereof corresponding to a plurality of positioning reference signals.

FIG. 12 is a flow chart diagram illustrating another embodiment of a method 1200 for positioning reference signal resource configuration. In some embodiments, the method 1200 is performed by an apparatus, such as the network unit 104. In certain embodiments, the method 1200 may be performed by a processor executing program code, for example, a microcontroller, a microprocessor, a CPU, a GPU, an auxiliary processing unit, a FPGA, or the like.

In various embodiments, the method 1200 includes receiving 1202, at a location server, information corresponding to a location of at least one user equipment. In some embodiments, the method 1200 includes determining 1204 a first set of positioning reference signals of a plurality of positioning reference signals based on the information corresponding to the location of the at least one user equipment and a second set of positioning reference signals of a plurality of positioning reference signals based on the information corresponding to the location of the at least one user equipment, wherein the first set of positioning reference signals are enabled and the second set of positioning reference signals are disabled. In various embodiments, the method 1200 includes transmitting 1206 the first set of positioning reference signals.

In certain embodiments, the information corresponding to the location of the at least one user equipment facilitates efficient transmission of a positioning reference signal resource configuration for performing measurements, performing a computation of a location estimate, or a combination thereof corresponding to a specific positioning technique or a hybrid positioning technique. In some embodiments, the information corresponding to the location of the at least one user equipment comprises a beam identifier, a group of beam identifiers, or a group beam identifier that provides location information corresponding to a user equipment within a geographic region of a serving base station.

In various embodiments, the information corresponding to the location of the at least one user equipment is transmitted from a base station, the base station receives an apriori signal from at least one user equipment, and the apriori signal comprises the beam identifier, the group of beam identifiers, or the group beam identifier. In one embodiment, the apriori signal is transmitted via a physical uplink control channel transmission, a physical uplink shared channel transmission, a medium access control message, radio resource control signaling, a positioning protocol, or some combination thereof. In certain embodiments, the method 1200 further comprises transmitting the first set of positioning reference signals based on a predetermined pattern.

Figure 13:
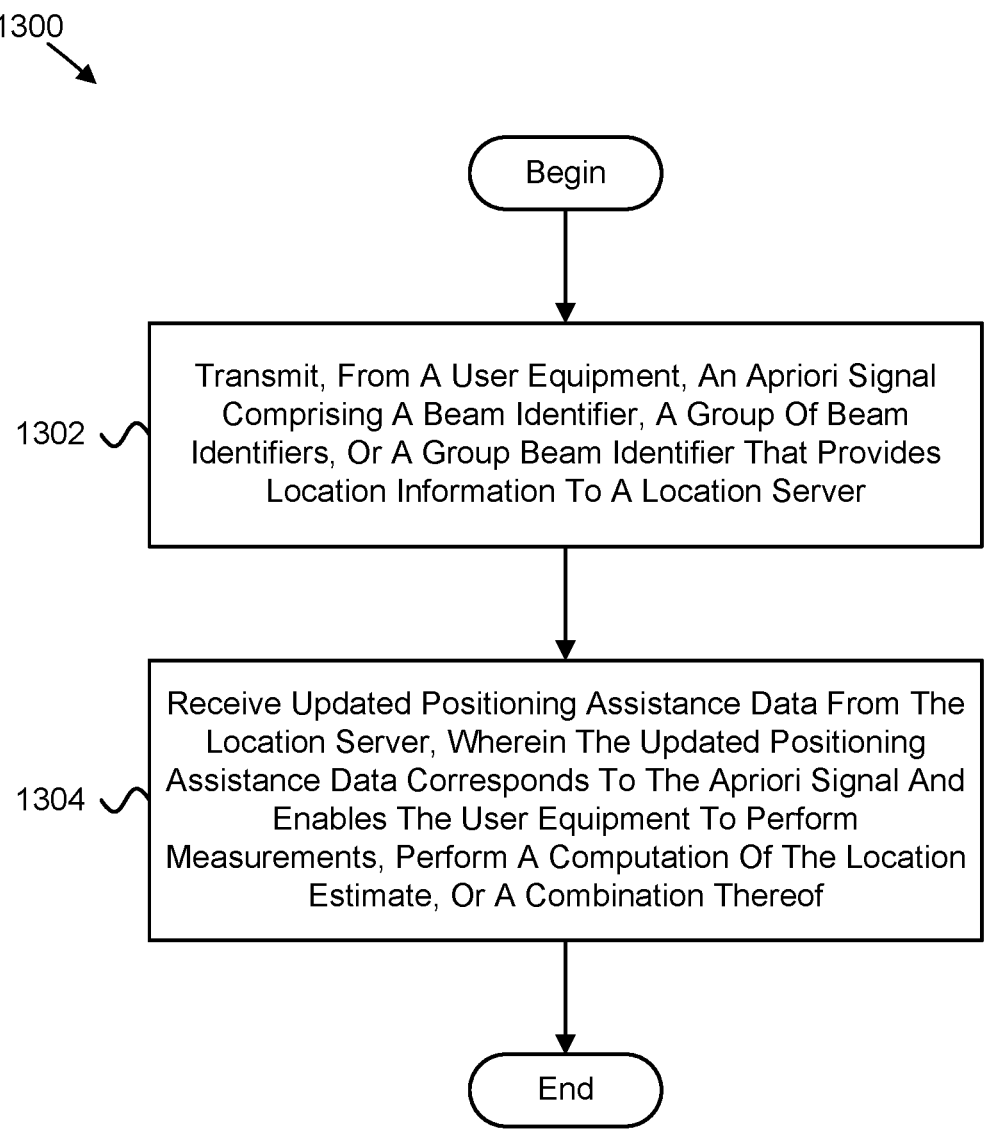
FIG. 13 is a flow chart diagram illustrating one embodiment of a method for updating positioning assistance data.

FIG. 13 is a flow chart diagram illustrating one embodiment of a method 1300 for updating positioning assistance data. In some embodiments, the method 1300 is performed by an apparatus, such as the remote unit 102. In certain embodiments, the method 1300 may be performed by a processor executing program code, for example, a microcontroller, a microprocessor, a CPU, a GPU, an auxiliary processing unit, a FPGA, or the like.

In various embodiments, the method 1300 includes transmitting 1302, from a user equipment, an apriori signal comprising a beam identifier, a group of beam identifiers, or a group beam identifier that provides location information to a location server. In some embodiments, the method 1300 includes receiving 1304 updated positioning assistance data from the location server, wherein the updated positioning assistance data corresponds to the apriori signal and enables the user equipment to perform measurements, perform a computation of the location estimate, or a combination thereof.

In certain embodiments, the apriori signal is transmitted via a physical uplink control channel transmission, a physical uplink shared channel transmission, a medium access control message, radio resource control signaling, a positioning protocol, or some combination thereof. In some embodiments, the method 1300 further comprises receiving a first set of positioning reference signals of a plurality of positioning reference signals based on the apriori signal.

In various embodiments, the first set of positioning reference signals are enabled and a second set of positioning reference signals of the plurality of positioning reference signals are disabled. In one embodiment, the method 1300 further comprises receiving a plurality of positioning reference signals based on a predetermined pattern. In certain embodiments, the updated positioning assistance data comprises quasi-co-location information, repetition information, comb-pattern information, muting information, or some combination thereof corresponding to a plurality of positioning reference signals.

In one embodiment, a method comprises: receiving, at a location server, a positioning reference signal resource configuration from at least one base station; determining positioning assistance data based on the positioning reference signal resource configuration, wherein the positioning assistance data comprises the positioning reference signal resource configuration for performing measurements, performing computation of a location estimate, or a combination thereof; and transmitting the positioning assistance data to a user equipment or to a target device to enable the user equipment or the target device to perform the measurements, perform the computation of the location estimate, or the combination thereof.

In certain embodiments, the method further comprises receiving an indication that facilitates efficient transmission of the positioning reference signal resource configuration for performing the measurements, performing the computation of the location estimate, or the combination thereof corresponding to a specific positioning technique or a hybrid positioning technique.

In some embodiments, the indication comprises a beam identifier, a group of beam identifiers, or a group beam identifier that provides location information corresponding to the user equipment within a geographic region of a serving base station.

In various embodiments, the indication is transmitted from a base station, the base station receives an apriori signal from at least one user equipment, and the apriori signal comprises the beam identifier, the group of beam identifiers, or the group beam identifier.

In one embodiment, the apriori signal is transmitted via a physical uplink control channel transmission, a physical uplink shared channel transmission, a medium access control message, radio resource control signaling, a positioning protocol, or some combination thereof.

In certain embodiments, the indication is transmitted from the user equipment, and the apriori signal comprises the beam identifier, the group of beam identifiers, or the group beam identifier.

In some embodiments, the apriori signal is transmitted via a physical uplink control channel transmission, a physical uplink shared channel transmission, a medium access control message, radio resource control signaling, a positioning protocol, or some combination thereof.

In various embodiments, the method further comprises transmitting a first set of positioning reference signals of a plurality of positioning reference signals based on the indication.

In one embodiment, the first set of positioning reference signals are enabled and a second set of positioning reference signals of the plurality of positioning reference signals are disabled.

In certain embodiments, the method further comprises transmitting a plurality of positioning reference signals based on a predetermined pattern.

In some embodiments, the positioning assistance data comprises quasi-co-location information, repetition information, comb-pattern information, muting information, or some combination thereof corresponding to a plurality of positioning reference signals.

In one embodiment, an apparatus comprises a location server. The apparatus further comprises: a receiver that receives a positioning reference signal resource configuration from at least one base station; a processor that determines positioning assistance data based on the positioning reference signal resource configuration, wherein the positioning assistance data comprises the positioning reference signal resource configuration for performing measurements, performing computation of a location estimate, or a combination thereof; and a transmitter that transmits the positioning assistance data to a user equipment or to a target device to enable the user equipment or the target device to perform the measurements, perform the computation of the location estimate, or the combination thereof.

In certain embodiments, the receiver receives an indication that facilitates efficient transmission of the positioning reference signal resource configuration for performing the measurements, performing the computation of the location estimate, or the combination thereof corresponding to a specific positioning technique or a hybrid positioning technique.

In some embodiments, the indication comprises a beam identifier, a group of beam identifiers, or a group beam identifier that provides location information corresponding to the user equipment within a geographic region of a serving base station.

In various embodiments, the indication is transmitted from a base station, the base station receives an apriori signal from at least one user equipment, and the apriori signal comprises the beam identifier, the group of beam identifiers, or the group beam identifier.

In one embodiment, the apriori signal is transmitted via a physical uplink control channel transmission, a physical uplink shared channel transmission, a medium access control message, radio resource control signaling, a positioning protocol, or some combination thereof.

In certain embodiments, the indication is transmitted from the user equipment, and the apriori signal comprises the beam identifier, the group of beam identifiers, or the group beam identifier.

In some embodiments, the apriori signal is transmitted via a physical uplink control channel transmission, a physical uplink shared channel transmission, a medium access control message, radio resource control signaling, a positioning protocol, or some combination thereof.

In various embodiments, the transmitter transmits a first set of positioning reference signals of a plurality of positioning reference signals based on the indication.

In one embodiment, the first set of positioning reference signals are enabled and a second set of positioning reference signals of the plurality of positioning reference signals are disabled.

In certain embodiments, the transmitter transmits a plurality of positioning reference signals based on a predetermined pattern.

In some embodiments, the positioning assistance data comprises quasi-co-location information, repetition information, comb-pattern information, muting information, or some combination thereof corresponding to a plurality of positioning reference signals.

In one embodiment, a method comprises: receiving, at a location server, information corresponding to a location of at least one user equipment; determining a first set of positioning reference signals of a plurality of positioning reference signals based on the information corresponding to the location of the at least one user equipment and a second set of positioning reference signals of a plurality of positioning reference signals based on the information corresponding to the location of the at least one user equipment, wherein the first set of positioning reference signals are enabled and the second set of positioning reference signals are disabled; and transmitting the first set of positioning reference signals.

In certain embodiments, the information corresponding to the location of the at least one user equipment facilitates efficient transmission of a positioning reference signal resource configuration for performing measurements, performing a computation of a location estimate, or a combination thereof corresponding to a specific positioning technique or a hybrid positioning technique.

In some embodiments, the information corresponding to the location of the at least one user equipment comprises a beam identifier, a group of beam identifiers, or a group beam identifier that provides location information corresponding to a user equipment within a geographic region of a serving base station.

In various embodiments, the information corresponding to the location of the at least one user equipment is transmitted from a base station, the base station receives an apriori signal from at least one user equipment, and the apriori signal comprises the beam identifier, the group of beam identifiers, or the group beam identifier.

In one embodiment, the apriori signal is transmitted via a physical uplink control channel transmission, a physical uplink shared channel transmission, a medium access control message, radio resource control signaling, a positioning protocol, or some combination thereof.

In certain embodiments, the method further comprises transmitting the first set of positioning reference signals based on a predetermined pattern.

In one embodiment, an apparatus comprises a location server. The apparatus further comprises: a receiver that receives information corresponding to a location of at least one user equipment; a processor that determines a first set of positioning reference signals of a plurality of positioning reference signals based on the information corresponding to the location of the at least one user equipment and a second set of positioning reference signals of a plurality of positioning reference signals based on the information corresponding to the location of the at least one user equipment, wherein the first set of positioning reference signals are enabled and the second set of positioning reference signals are disabled; and a transmitter that transmits the first set of positioning reference signals.

In certain embodiments, the information corresponding to the location of the at least one user equipment facilitates efficient transmission of a positioning reference signal resource configuration for performing measurements, performing a computation of a location estimate, or a combination thereof corresponding to a specific positioning technique or a hybrid positioning technique.

In some embodiments, the information corresponding to the location of the at least one user equipment comprises a beam identifier, a group of beam identifiers, or a group beam identifier that provides location information corresponding to a user equipment within a geographic region of a serving base station.

In various embodiments, the information corresponding to the location of the at least one user equipment is transmitted from a base station, the base station receives an apriori signal from at least one user equipment, and the apriori signal comprises the beam identifier, the group of beam identifiers, or the group beam identifier.

In one embodiment, the apriori signal is transmitted via a physical uplink control channel transmission, a physical uplink shared channel transmission, a medium access control message, radio resource control signaling, a positioning protocol, or some combination thereof.

In certain embodiments, the transmitter transmits the first set of positioning reference signals based on a predetermined pattern.

In one embodiment, a method comprises: transmitting, from a user equipment, an apriori signal comprising a beam identifier, a group of beam identifiers, or a group beam identifier that provides location information to a location server; and receiving updated positioning assistance data from the location server, wherein the updated positioning assistance data corresponds to the apriori signal and enables the user equipment to perform measurements, perform a computation of the location estimate, or a combination thereof.

In certain embodiments, the apriori signal is transmitted via a physical uplink control channel transmission, a physical uplink shared channel transmission, a medium access control message, radio resource control signaling, a positioning protocol, or some combination thereof.

In some embodiments, the method further comprises receiving a first set of positioning reference signals of a plurality of positioning reference signals based on the apriori signal.

In various embodiments, the first set of positioning reference signals are enabled and a second set of positioning reference signals of the plurality of positioning reference signals are disabled.

In one embodiment, the method further comprises receiving a plurality of positioning reference signals based on a predetermined pattern.

In certain embodiments, the updated positioning assistance data comprises quasi-co-location information, repetition information, comb-pattern information, muting information, or some combination thereof corresponding to a plurality of positioning reference signals.

In one embodiment, an apparatus comprises a user equipment. The apparatus further comprises: a transmitter that transmits an apriori signal comprising a beam identifier, a group of beam identifiers, or a group beam identifier that provides location information to a location server; and a receiver that receives updated positioning assistance data from the location server, wherein the updated positioning assistance data corresponds to the apriori signal and enables the user equipment to perform measurements, perform a computation of the location estimate, or a combination thereof.

In certain embodiments, the apriori signal is transmitted via a physical uplink control channel transmission, a physical uplink shared channel transmission, a medium access control message, radio resource control signaling, a positioning protocol, or some combination thereof.

In some embodiments, the receiver receives a first set of positioning reference signals of a plurality of positioning reference signals based on the apriori signal.

In various embodiments, the first set of positioning reference signals are enabled and a second set of positioning reference signals of the plurality of positioning reference signals are disabled.

In one embodiment, the receiver receives a plurality of positioning reference signals based on a predetermined pattern.

In certain embodiments, the updated positioning assistance data comprises quasi-co-location information, repetition information, comb-pattern information, muting information, or some combination thereof corresponding to a plurality of positioning reference signals.

Embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

The invention claimed is:

1. A method performed by a location server, the method comprising:

receiving a positioning reference signal (PRS) resource configuration from at least one base station;

determining positioning assistance data based on the PRS resource configuration, wherein the positioning assistance data comprises the PRS resource configuration for performing measurements and performing computation of a location estimate; and transmitting the positioning assistance data to a user equipment (UE) or to a target device to enable the UE or the target device to perform the measurements and perform the computation of the location estimate, wherein the positioning assistance data comprises an update to a previously transmitted positioning assistance data and further comprises quasi-co-location (QCL) information, repetition information, comb-pattern information, and muting information corresponding to a plurality of PRSs.

2. The method of claim 1, further comprising receiving an indication that facilitates efficient transmission of the PRS resource configuration for one or more of performing the measurements or performing the computation of the location estimate corresponding to a specific positioning technique or a hybrid positioning technique.

3. The method of claim 2, wherein the indication comprises a transmission and reception point (TRP) identifier, a group of TRP identifiers, or a group TRP identifier that provides location information corresponding to the UE within a geographic region of a serving base station.

4. The method of claim 3, wherein the indication is transmitted from a base station, the location server receives an apriori signal from at least one UE, and the apriori signal comprises the TRP identifier, the group of TRP identifiers, or the group TRP identifier.

5. The method of claim 4, wherein the apriori signal is transmitted via one or more of a physical uplink control channel (PUCCH) transmission, a physical uplink shared channel (PUSCH) transmission, a medium access control (MAC) message, radio resource control (RRC) signaling, or a positioning protocol.

6. The method of claim 3, wherein the indication is transmitted from the UE, and an apriori signal comprises the TRP identifier, the group of TRP identifiers, or the group TRP identifier.

7. The method of claim 2, further comprising transmitting a first set of PRSs of a plurality of PRSs based on the indication.

8. The method of claim 7, wherein the first set of PRSs remain enabled and a second set of PRSs of the plurality of PRSs are disabled.

9. The method of claim 2, wherein the indication is preceded by one or more of a request for the indication or measurements from the location server.

10. The method of claim 9, wherein the indication and the request for the indication are signaled using a new radio (NR) positioning protocol annex (NRPPa) protocol.

11. A method performed by a location server, the method comprising:

receiving information corresponding to a location of at least one user equipment (UE);

determining a first set of positioning reference signals (PRSs) of a plurality of PRSs based on the information corresponding to the location of the at least one UE and a second set of PRSs of the plurality of PRSs based on the information corresponding to the location of the at least one UE, wherein the first set of PRSs are enabled and the second set of PRSs are disabled;

transmitting the first set of PRSs; and transmitting positioning assistance data to a UE or to a target device to enable the UE or a target device to perform measurements and perform a computation of a location estimate, wherein the positioning assistance data comprises an update to a previously transmitted positioning assistance data and further comprises quasi-co-location (QCL) information, repetition information, comb-pattern information, and muting information corresponding to a plurality of PRSs.

12. The method of claim 11, wherein the information corresponding to the location of the at least one UE facilitates efficient transmission of a PRS resource configuration for one or more of performing measurements or performing a computation of a location estimate to a specific positioning technique or a hybrid positioning technique.

13. The method of claim 11, wherein the information corresponding to the location of the at least one UE comprises a transmission and reception point (TRP) identifier, a group of TRP identifiers, or a group TRP identifier that provides location information corresponding to a UE within a geographic region of a serving base station.

14. A method performed by a user equipment (UE), the method comprising:

transmitting an apriori signal comprising a beam identifier, a group of beam identifiers, or a group beam identifier that provides location information to a location server; and receiving updated positioning assistance data from the location server, wherein the updated positioning assistance data corresponds to the apriori signal and enables the UE to perform measurements and a computation of a location estimate, and wherein the updated positioning assistance data comprises an update to a previously received positioning assistance data and further comprises quasi-co-location (QCL) information, repetition information, comb-pattern information, and muting information corresponding to a plurality of positioning reference signals (PRSs).

15. The method of claim 14, wherein the apriori signal is transmitted via one or more of a physical uplink control channel (PUCCH) transmission, a physical uplink shared channel (PUSCH) transmission, a medium access control (MAC) message, radio resource control (RRC) signaling, or a positioning protocol.

16. The method of claim 14, further comprising receiving a first set of PRSs of a plurality of PRSs based on the apriori signal.

17. The method of claim 16, wherein the first set of PRSs are enabled and a second set of PRSs of the plurality of PRSs are disabled.

18. The method of claim 14, further comprising receiving a plurality of PRSs based on a predetermined pattern.

19. The method of claim 14, wherein the updated positioning assistance data comprises one or more of quasi-co-location (QCL) information, repetition information, comb-pattern information, or muting information corresponding to a plurality of PRSs.

* * * * *